US008504580B2

(12) United States Patent
Geller

(10) Patent No.: US 8,504,580 B2
(45) Date of Patent: Aug. 6, 2013

(54) SYSTEMS AND METHODS FOR CREATING AN ARTIFICIAL INTELLIGENCE

(76) Inventor: Ilya Geller, Brooklyn, NY (US)

( * ) Notice: Subject to any disclaimer, the term of this patent is extended or adjusted under 35 U.S.C. 154(b) by 294 days.

(21) Appl. No.: 12/714,980

(22) Filed: Mar. 1, 2010

(65) Prior Publication Data
US 2010/0228756 A1    Sep. 9, 2010

Related U.S. Application Data

(60) Provisional application No. 61/156,999, filed on Mar. 3, 2009.

(51) Int. Cl.
*G06F 7/00* (2006.01)
*G06F 17/30* (2006.01)

(52) U.S. Cl.
USPC .......................................... 707/758; 707/730

(58) Field of Classification Search
USPC ......................................... 707/758, 999.005
See application file for complete search history.

(56) References Cited

U.S. PATENT DOCUMENTS

| | | | |
|---|---|---|---|
| 6,199,067 B1 * | 3/2001 | Geller | 707/999.003 |
| 7,756,847 B2 * | 7/2010 | Pauws et al. | 707/705 |
| 2007/0112783 A1 * | 5/2007 | McCreight et al. | 707/999.01 |
| 2009/0144609 A1 * | 6/2009 | Liang et al. | 715/230 |
| 2009/0198671 A1 * | 8/2009 | Zhang et al. | 707/999.005 |
| 2009/0276467 A1 * | 11/2009 | Scholtes et al. | 707/999.2 |
| 2011/0040733 A1 * | 2/2011 | Sercinoglu et al. | 707/688 |

* cited by examiner

*Primary Examiner* — Alexey Shmatov
*Assistant Examiner* — Bryan Walker
(74) *Attorney, Agent, or Firm* — Cooper & Dunham LLP

(57) ABSTRACT

A computer system implemented method of creating and using artificial intelligence wherein the system includes a first table including at least one textual portion and at least one context phrase contained in the textual portion and the computer system is capable of communication via a network with the user using at least one electronic device, the method comprising: receiving at least one textual input from the user, extracting at least one portion of the textual input from the user and at least one context phrase therefrom, comparing each portion extracted from the textual input from the user to other portions extracted from the textual input from the user according to a first matching algorithm that utilizes the context phrases of each respective portion, and storing in the first table, the portions and respective context phrases that were extracted from the textual input from the user that satisfy the matching algorithm.

18 Claims, 1 Drawing Sheet

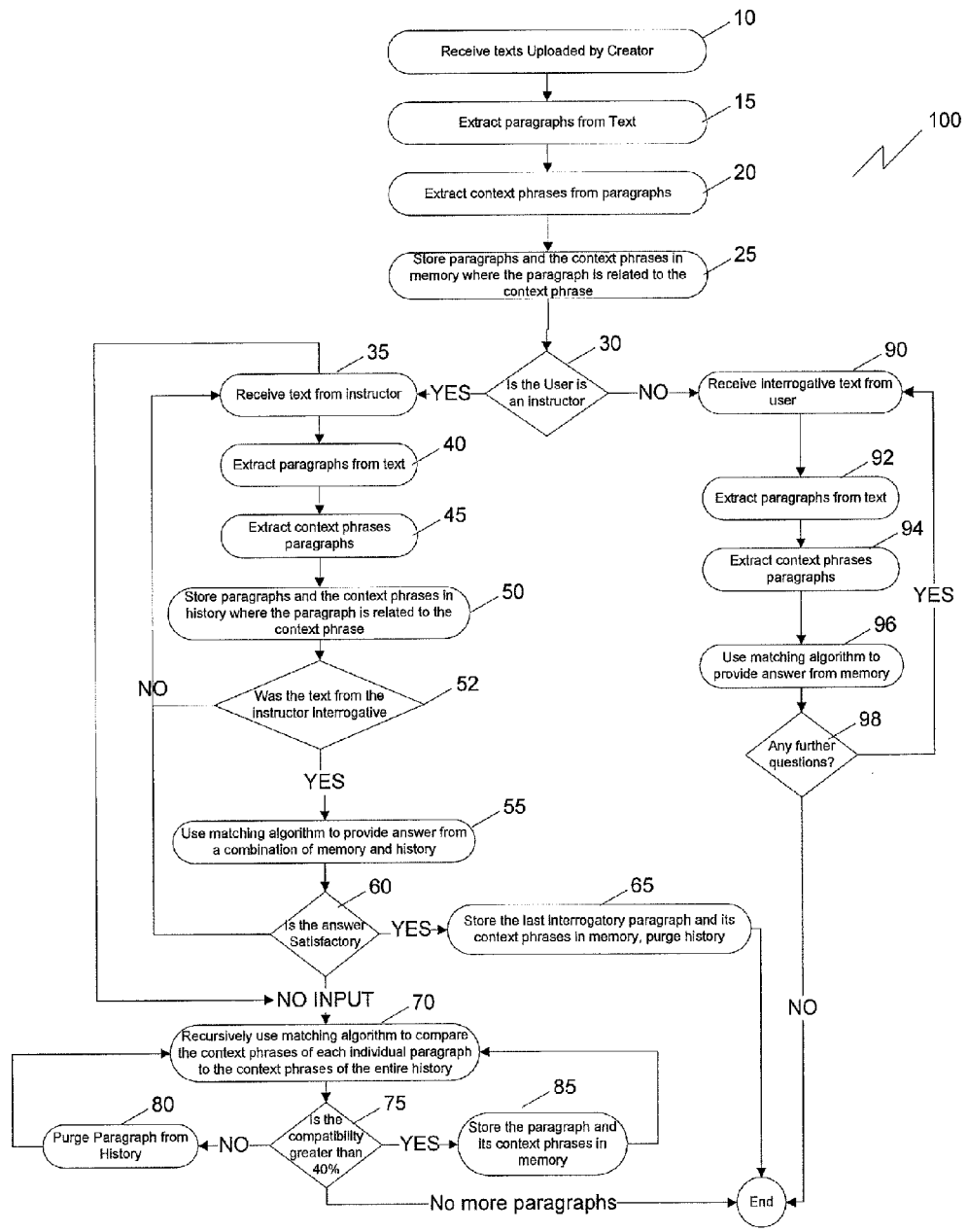

SYSTEMS AND METHODS FOR CREATING AN ARTIFICIAL INTELLIGENCE

CROSS-REFERENCE TO RELATED APPLICATION

This application claims the benefit of priority under 35 U.S.C. 119(e) to U.S. Provisional Application Ser. No. 61/156,999, filed Mar. 3, 2009, entitled "SYSTEMS AND METHODS FOR CREATING AN ARTIFICIAL INTELLIGENCE," the entire disclosure of which is incorporated by reference herein.

INCORPORATION BY REFERENCE

U.S. Pat. No. 6,199,067 titled "System and method for generating personalized user profiles and for utilizing the generated user profiles to perform adaptive internet searches," and issued to the same inventor, is incorporated by reference herein.

FIELD OF THE INVENTION

The present invention is directed to the field of artificial intelligence and advertising.

BACKGROUND OF THE INVENTION

For as long as computers have been around, human imagination has been intrigued by the possibility of creating artificial intelligence. Technology has been steadily progressing and creating more and more intelligent machines. IBM's Deep Blue was used to outplay Gary Kasparov in chess. Video games now include characters that intelligently respond to player's actions. However, emulation of intelligence is a high watermark that scientists strive to achieve. Accordingly, the present invention is directed towards a system and method of creating and teaching an artificial intelligence to emulate a human and subsequently querying such artificial intelligence for various purposes.

SUMMARY OF THE INVENTION

In one embodiment, there is disclosed a computer system implemented method of creating and using artificial intelligence based upon a user. The computer system of the embodiment includes a first table which includes at least one textual portion and at least one context phrase contained in the textual portion. The computer system of the embodiment is capable of communication via a network with the user using at least one electronic device. The method includes the steps of receiving at least one textual input from the user; extracting at least one portion of the textual input from the user and at least one context phrase therefrom; comparing each portion extracted from the textual input from the user to other portions extracted from the textual input from the user according to a first matching algorithm that utilizes the context phrases of each respective portion; and storing in the first table, the portions and respective context phrases that were extracted from the textual input from the user that satisfy the matching algorithm. In further embodiments the portions are textual paragraphs.

In further embodiments the method includes additional steps of receiving a message and at least one textual input associated with the message, extracting at least one portion of the textual input associated with the message and at least one context phrase therefrom, and comparing each portion extracted from the textual input associated with the message to portions stored in the first table according to a second matching algorithm that utilizes the context phrases of each respective portion, and displaying the message to the user if the second matching algorithm is satisfied.

In another embodiment, there is disclosed computer implemented method of creating and querying an artificial intelligence. The method includes the steps of receiving a first type of textual input, extracting at least one portion of the first type of textual input and at least one context phrase therefrom, storing each extracted portion of the first type of textual input and each context phrase extracted therefrom in a first table, receiving a second type of textual input, extracting at least one portion of the second type of textual input and at least one context phrase therefrom, storing each extracted portion of the second type of textual input and each context phrase extracted therefrom in a second table, comparing each portion stored in the second table to every other portion stored in the second table and to every portion stored in the first table according to a matching algorithm that utilizes the context phrases of each respective portion, and storing in the first table the portion and context phrases of each portion stored in the second table that satisfies the matching algorithm.

BRIEF DESCRIPTION OF THE FIGURES

FIG. 1 is flow chart diagram of an exemplary embodiment of the present invention.

DETAILED DESCRIPTION OF THE INVENTION

Certain embodiments of the present invention will be discussed and it should be noted that references in the specification to phrases such as "one embodiment" or "an embodiment" mean that a particular feature, structure or characteristic described in connection with the embodiment is included in at least one embodiment of the invention. The appearances or phrases such as "in one embodiment" in various places in the specification are not necessarily, but can be, referring to same embodiment.

In an embodiment of the invention, an Artificially Intelligent system ("AI Clone") is created and taught by a creator such that it becomes capable of accurately answering questions directed to one or more topics of any kind.

The AI Clone is implemented on a specialized computer-based system, operative with specific programming for providing the functionality, as described herein. The computer based system includes such art recognized components as are ordinarily found in computer systems, including but not limited to processors, RAM, ROM, clocks, hardware drivers, associated storage (computer readable medium), and the like. The computer-based system may include servers and connections to networks such as the Internet, LAN, or other communication networks.

Initially, the AI Clone may be created by the providing one or more relevant texts to a database. Thereafter, to improve the AI Clone's knowledge and accuracy, an instructor (who may be one or more people) can conduct "lessons" with the AI Clone to teach it additional information. Once the AI Clone is created, users can converse with the AI Clone, and receive answers to their questions. In alternate embodiments the AI Clone emulates the user and may be queried to determine whether the user would be receptive to a message or advertisement. In certain embodiments the AI Clone may be created solely from an instant message, email, sms, or other similar activities of a particular user that the AI Clone is to emulate. In certain embodiments, the AI Clone may be created solely from an instant message, email, sms, or other similar activities of a particular user that the AI Clone is to emulate. It should be noted that the actual initialization and instantiation of the AI Clone and its memory may be triggered prior to any textual inputs. For example, it may be triggered by User's accessing of an application, a connection to a user's IP, or other triggers that indicate anticipation of textual inputs.

The lessons to improve AI Clone's knowledge may be conducted in one or more of the following exemplary methods: direct interaction between an instructor and the AI Clone, a history of the instructor's casual work (as recorded in text), an instructor's instant messaging (or other similar types of) conversations that are manually or automatically input into AI Clone, or other similar ways. It should be noted that additional texts can be provided to the AI Clone at any time, and there is no minimum amount of text needed for the AI Clone to function so long as there is at least one character input into the AI Clone as text. It should also be noted that an "instructor" may be any type of user that knowingly, or unknowingly, interacts with AI Clone.

With reference to FIG. 1, if the AI Clone is to answer questions related to computer technical support, step 10, a creator could provide books and/or other texts related to computers (in alternate embodiments these texts can even be the creator's own work or even the initial "lesson" as described in detail below). The relevant texts are analyzed and information is extracted therefrom as portions, the preferable portion being a paragraph, step 15, from which context phrases are extracted in step 20. A paragraph is a subdivision of a written composition that consists of one or more sentences, deals with one point or gives the words of one speaker, and can be extracted from text based upon textual indicators such as, for example, a hard return or tab (although any other suitable algorithm may be used). A context phrase is a "predicative definition" characterized by combinations of nouns and other parts of speech, such as a verb and an adjective (e.g., city-be-in). A single sentence may include one or more predicative definitions.

Each paragraph has exactly one context, which is a combination of all context phrases, which can number in the thousands. The extracted paragraphs and their contexts are stored as structured data in a table or tables, such as a database or multiple related databases, step 25, that form the memory of the AI Clone. In various embodiments, it is envisioned that other parts of speech may be included within the context and additional information may be extracted from paragraphs. In further embodiments, other predicative definitions, such as a subtext, which is characterized by the combination of a pronoun, a verb, and an adjective (or another part of speech) may be utilized. It should be noted that textual information stored in the memory of the AI Clone does not have to be stored as text, and may be stored as binary code, encrypted data, or any other format that can be converted back into text.

The AI Clone preferably includes a matching algorithm that answers questions by comparing a user's question to its memory in order to find a suitable answer. Each interrogatory paragraph by a user is treated as a paragraph and the AI Clone extracts a context therefrom. The AI Clone then compares the structured data of the interrogatory paragraph to the structured data in its memory and provides a result based upon a compatibility algorithm. A preferred compatibility algorithm can be:

$$\text{Compatibility} = \left( \frac{\text{Sum(Weight of the same phrase in User summary} * \text{Weight of the same phrase in Text summary)}}{sqrt(\text{Sum(Weight of each phrase in User summary}^2) * \text{Sum(Weight of each phrase in Text summary}^2))} \right) * 100$$

where the weight refers to the frequency that a context phrase occurs in relation to other context phrases. This compatibility algorithm is exemplary and other algorithms may be used within the scope of this invention.

For example, to determine the weight of a context phrase in a paragraph, AI Clone may first analyze the weight of the context phrase in each sentence of the paragraph. AI Clone treats each clause of a sentence as an individual sentence—the clauses are preferably determined based upon figures of speech and punctuation marks. For example, a semicolon or comma followed by a "but" may indicate a division between clauses if they separate a subject and predicate pair. Clauses can also be identified by a location of related noun and verb pairs that represent subjects and predicates. It should be noted these algorithms are exemplary, and any clause-recognizing algorithm presently known or subsequently developed may be utilized.

For each sentence, the AI Clone calculates the number of all context phrases that occur in that sentence. If there are 24 different context phrases in a sentence then the weight of each phrase in the text is $1/24$. However, in an alternate embodiment, the AI Clone may ignore the comparative number of occurrences and calculate an "absolute weight"; in such a case the weight of a contextual phrase that exists twice in one sentence would be 2 regardless of the number of other context phrases.

To determine the weight of a context phrase in the paragraph, the weights of the relevant context phrases in each sentence of the paragraph are added together. For example, if there are four sentences in the paragraph and the weights of the relevant context phrase are $1/24$, $1/4$, $1/6$, and $1/2$, then the weight of the context phrase in the paragraph is $23/24$. In the embodiments where absolute weight of context phrases is used, and where, for example, the relevant weights of the context phrase within four sentences are 1, 2, 1, and 1, the weight of the context phrase in the paragraph would be 5.

Additionally, because paragraphs can be different lengths, in order to improve accuracy of the matching, the weight of the context phrase in each paragraph may be further weighted based on the size of the entire paragraph. For example, if the paragraph is 120 words then the weight of the context phrase in that paragraph is divided by 120: $(23/24)/120$. In the embodiments that use absolute weights the length of the paragraph is preferably ignored and thus, if, for example, a context phrase is present 5 times in one paragraph, the final weight of that phrase in that paragraph is 5. It should be noted the described algorithms are exemplary, and alternate algorithms may be used within the scope of this invention so long as matching is accurately performed.

At the initial stage, after step 25, with only the structured information extracted from the texts, which were provided by the user, existing in AI Clone's memory, the knowledge of the AI Clone is likely to be incomplete. It should be noted that in certain embodiments no texts are uploaded by the user, and the AI Clone may be pre-created and pre-loaded with default structured information or information that is generated depending on answers to questions or questionnaires. According to an embodiment of the present invention, knowledge of the AI Clone is expanded through "lessons" by an instructor, determined in step 30, (the instructor and creator of the AI Clone may be the same person). An instructor of the AI Clone can instruct the AI Clone in a series of lectures, question and answer sessions, step 35 through step 85, with the AI Clone retaining, in its memory, the relevant parts of each session, step 65 or step 85.

In one embodiment each lesson starts with AI Clone being provided textual information, either through automatic extraction, or through the instructor providing the AI Clone with different types of textual inputs such as, asking the AI Clone a question, or series of questions, related to a topic that the instructor wants the AI Clone to know or declarative statements that require no answers from the AI Clone, additional textual uploads, etc., step 35. If the AI Clone is to provide technical support, a question may be "What is a mouse?" In response to the question, the AI Clone considers the question as a plurality of paragraphs, step 40, and extracts the context from each paragraph, step 45; stores each paragraph and its context in a "history," step 50; and then uses the context of the question together with the matching algorithm, described above, to provide a suitable answer from its memory and history, steps 52 and 55. Such an answer could be "a mouse is a peripheral attached to a computer for user input." It should be noted that only the instructor's input is saved to the history of the AI Clone. The answer that is provided may be a sentence, a collection of words, or a paragraph, depending on the matching algorithm and subsequent processing algorithms utilized and this invention should not be limited to any such algorithm.

If the instructor feels that this information is incomplete, the instructor can teach the AI Clone any additional information, in step 35, for example, by instructing the AI Clone that: "A mouse is a peripheral attached to a computer for user input that is used to control a cursor on a screen."

In response to receiving the new information, the AI Clone can extract paragraphs and the contexts of those paragraphs from the new information, in step 40 and step 45; and stores the paragraphs and their contexts in the history, step 50.

To confirm that information has been learned, the instructor could ask his question again, step 35. At which the point the AI Clone performs the same process as described above and breaks the question down into paragraphs and extracts the contexts therefrom; stores the paragraphs and their contexts in the history; and then could use the context of the question together with the matching algorithm, described above, to provide a suitable answer from a combination of its memory and the history. This time, the answer preferably includes the information that was taught to the AI Clone.

If the instructor is satisfied with the answer, it may instruct the AI Clone to learn it, step 60. If so instructed, the AI Clone saves the correct answer paragraph and to its memory, and the rest of the history is preferably purged, step 65. If the instructor is unsatisfied with the answer, step 60, the instructor can continue teaching the AI Clone with additional information until a satisfactory answer is reached. It should be noted that in certain embodiments the history may not purged, and may be stored in another table, or marked in some way, for example, set off by some symbols, to indicate that it is not to be included in the memory of the AI Clone.

As an alternative to instructing the AI Clone to remember the correct answer, the instructor can leave it up to the AI Clone, to learn by itself (this may also occur in situations where the instructor forgets to provide instructions), step 60. After a lesson is over, the AI Clone can select one or more specific paragraphs (and their contexts) from the history and store them in memory, while purging the remainder of the paragraphs, in steps 70 through 85. It should be noted, that in various embodiments, history may not be purged after each lesson, in which case the AI Clone will preferably keep a chronological record of the lessons and extract information from the latest lesson.

The AI Clone can select the paragraphs (and their contexts) to store to memory based upon the compatibility between the context of each paragraph and the context of the entire history, step 70. The context of the entire history can be calculated by summing the weights of the context of the individual paragraphs in the history. If the compatibility between the context in the individual paragraph and the context of the entire history is greater than 40%, step 70, then each paragraph (and its context) is added to memory, step 80, if not, each paragraph is purged, step 85. It should be noted that 40% is an arbitrary number and greater or lesser compatibilities may be selected to serve as the watermark for retention. Additionally, while it is preferable that the majority of an AI Clone's memory is derived from the lessons provided to the AI Clone, the ratio of the lessons to the texts may take on any proportion.

Once created, the AI Clone can be used to answer user's questions, step 90, in the same manner as it answered the instructor's questions when it was made, step 92 through step 96. For example, an AI Clone can be used to replace information tellers, tech support representatives, legal advisors, and/or serve as intelligent encyclopedias. Interactions between the AI Clone and user, creator, or instructor may be performed through a keyboard, graphic user interface, voice recognition, handwriting, wirelessly, or any other method that permits input of text to the AI Clone, either directly or through an interface that converts input into text. AI Clone can provide output in any way. For example, the output can be audibly through a speaker, as text on a display, as a printout from a printer, as a video on a display or in any other way to suitably covey the information. It should be noted, that since AI Clone preferably uses paragraphs in its algorithm, information that is received through a medium that does not provide organized text (for example, voice recognition) algorithms presently known, or hereafter developed, may be used to organize the speech into paragraphs.

In certain embodiments, an AI Clone may based upon an average user and the AI Clone can be used to direct advertising to the user by determining compatibility between the advertisement and the AI Clone. In those embodiments the AI Clone may be created from a first interaction with the user according as described steps 10 through 25, or it may also come preloaded with structured data including default paragraphs and context phrases. For example, if the AI Clone software is part of a larger package downloaded by people interested in a particular type of product, then certain information regarding that product may be stored in the AI Clone's memory by default, prior to any interaction with a user. The AI Clone may also be preloaded with paragraphs and contexts based upon a questionnaire that a user is asked to fill out prior to using the AI Clone.

In the embodiments where the AI Clone is to emulate an average user, the AI Clone is preferably taught through automated extraction of textual inputs from a user's interactions with certain applications such as an instant messaging client, an email program, an sms client, or other similar application. These extracted textual inputs are "lessons" that may be stored in the AI Clone, according to the algorithm described above in reference to steps 70 through 85 or another similar algorithm.

The AI Clone based on a user may then be queried by an advertiser by providing a text associated with an advertisement to the AI Clone. This text may be the transcript of the advertisement, or a description of a video advertisement by way of example. This text may be embedded in the advertisement's metadata or it may be automatically extracted from the advertisement. The AI Clone can then compare the compatibility between the text associated with the advertisement and the memory of AI Clone according to a matching algorithm similar to the one described above in steps 70 through 75. If the text associated with the advertisement is compatible with the memory of the AI Clone, then the advertisement is displayed to the user. Then, if the user clicks on the advertisement or performs some other similar favorable action, the paragraphs of the text associated with the advertisement and the respective context phrases may be stored in the memory of the AI Clone. It should be noted that the algorithm used to determine whether to display the advertisement can be the same or different from the algorithm used to teach the AI Clone. The algorithm could be more, or less restrictive with respect to the compatibility, depending on, for example, whether one prefers more or less precision in the targeting of advertisements.

In the foregoing description, the methods and systems of the present invention have been described with reference to specific embodiments. It is to be understood and expected that variations in the principles of the methods and the systems herein disclosed may be made by one of ordinary skill in the art and it is intended that such modifications, changes, and substitutions are to be included within the scope of the present invention as set forth in the appended claims. The specification and the drawings are accordingly to be regarded in an illustrative, rather than in a restrictive sense.

I claim:

1. A computer system implemented method of creating and using multiple artificial intelligence (AI) clones of respective multiple entities comprising the following operations of a computer system:

for each of the multiple AI clones, receiving respective text into the computer system from one or more sources;

for each of the multiple AI clones, obtaining respective paragraphs from the text received for the AI clones;

at least some of the paragraphs comprising multiple sentences, and at least some of the sentences comprising multiple clauses identified based upon figures of speech and punctuation;

obtaining a first set of respective context phrases from the received paragraphs, which context phrases are obtained from the respective clauses and are indicative of the context of the respective paragraphs;

obtaining respective weights of the context phrases using parameters related to frequency of occurrence of a context phrase relative to other context phrases or to absolute number of occurrences of a context phrase therein;

storing the context phrases and the paragraphs as structured data in one or more tables to thereby create initial respective multiple AI clones;

for multiple initial AI clones, improving the AI clones by adding paragraphs and a second set of context phrases from text subsequently supplied to the computer system by the source of the text that was used to create the initial AI clones and from one or more other sources, including one or more instructors, and by selectively deleting data from the one or more tables, to thereby create respective improved AI clones; and using the improved AI clones and any remaining initial AI clones that have not been improved, to answer questions posed by users through a process comprising using a compatibility test matching context phrases related to the respective questions to context phrases related to AI clones through a compatibility algorithm relating weights of context phrases related to a question and weights of context phrases related to AI clones, and to direct advertisements to AI clones, wherein a single advertisement is directed essentially concurrently to multiple AI clones, using for the purpose a matching algorithm that uses selected matching criteria in comparing context phrases obtained from the questions or advertisements with said structured data in said one or more tables, which matching algorithm relates context phrases related to advertisements to context phrases related to AI clones and takes into account respective weights of the context phrases that the matching algorithm relates;

wherein the AI clones are configured to replace human sources of information in answering a user's question and assist advertisers in selecting plural AI clones that are likely to be receptive to a single advertisement to thereby direct the advertisement only to some of the AI clones, based on the content of the question and the advertisement.

2. The method of claim 1 further including adding, to an AI clone to which an advertisement has been directed in said using step, one or more paragraphs of that advertisement and one or more context phrases obtained from the last-recited paragraphs, to thereby further improve the AI clone.

3. The method of claim 1 wherein each context phrase is a combination of a noun with other parts of speech at least one of which is a verb or an adjective.

4. The method of claim 1 in which the step of improving an AI clone further comprises directing a question to an AI clone and, if an answer from the AI clone is not satisfactory to an instructor, storing a correct answer in the AI clone and deleting from the AI clone at least some of the history leading to the unsatisfactory answer.

5. The method of claim 1 in which the compatibility algorithm takes into account the frequency of occurrence of context phrases obtained from the question and context phrases obtained from a paragraph of the AI clone against which paragraph the question is being matched in said compatibility test.

6. The method of claim 1 in which the matching algorithm takes into account the frequency of occurrence of context phrases obtained from an AI clone and context phrases obtained from an advertisement.

7. The method of claim 1 in which the compatibility algorithm takes into account sizes of the paragraphs from which the context phrases are obtained.

8. The method of claim 1 in which said weights comprise a metric related to frequency of occurrence of context phrases in the respective paragraphs from which the context phrases were obtained.

9. The method of claim 1 in which said weights comprise a metric related to frequency of occurrence of context phrases relative to the frequency of occurrence of other context phases in the paragraphs from which they were obtained.

10. A non-transitory computer readable storage medium containing a program in a non-transitory form that when executed in a computer system causes the system to create and use artificial intelligence (AI) clones of respective multiple entities in a computer-implemented process comprising:

for each of the multiple AI clones, receiving respective text into the computer system from one or more sources;

for each of the multiple AI clones, obtaining respective paragraphs from the text received for the AI clones;

at least some of the paragraphs comprising multiple sentences, and at least some of the sentences comprising multiple clauses identified based upon figures of speech and punctuation;

obtaining a first set of respective context phrases from the received paragraphs, which context phrases are obtained from the respective clauses and are indicative of the context of the respective paragraphs;

obtaining respective weights of the context phrases using parameters related to frequency of occurrence of a context phrase relative to other context phrases or to absolute number of occurrences of a context phrase therein;

storing the context phrases and the paragraphs as structured data in one or more tables to thereby create initial respective multiple AI clones;

for multiple initial AI clones, improving the AI clones by adding paragraphs and a second set of context phrases from text subsequently supplied to the computer system by the source of the text that was used to create the initial AI clones and from one or more other sources, including one or more instructors, and by selectively deleting data from the one or more tables, to thereby create respective improved AI clones; and using the improved AI clones and any remaining initial AI clones that have not been improved, to answer questions posed by users through a process comprising using a compatibility test matching context phrases related to the respective questions to context phrases related to AI clones through a compatibility algorithm relating weights of context phrases related to a question and weights of context phrases related to AI clones, and to direct advertisements to AI clones, wherein a single advertisement is directed essentially concurrently to multiple AI clones, using for the purpose a matching algorithm that uses selected matching criteria in comparing context phrases obtained from the questions or advertisements with said structured data in said one or more tables, which matching algorithm relates context phrases related to advertisements to context phrases related to AI clones and takes into account respective weights of the context phrases that the matching algorithm relates;

wherein the AI clones are configured to replace human sources of information in answering a user's question and assist advertisers in selecting plural AI clones that are likely to be receptive to a single advertisement to thereby direct the advertisement only to some of the AI clones, based on the content of the question and the advertisement.

11. The storage medium of claim 10 in which said program is further configured to cause the computer system to add, to an AI clone to which an advertisement has been directed in said using step, one or more paragraphs of that advertisement and one or more context phrases obtained from the last-recited paragraphs, to thereby further improve the AI clone.

12. The storage medium of claim 10 in which said program is further configured to cause the computer system to cause each context phrase to be a combination of a noun with other parts of speech at least one of which is a verb or an adjective.

13. The storage medium of claim 10 in which said program is further configured to cause the computer system to improve an AI clone by directing a question to an AI clone and, if an answer from the AI clone is not satisfactory to an instructor, to store a correct answer in the AI clone and delete from the AI clone at least some of the history leading to the unsatisfactory answer.

14. The storage medium of claim 10 in which said program is further configured to cause the computer system to take into account in the compatibility algorithm the frequency of occurrence of context phrases obtained from the question and context phrases obtained from a paragraph of the AI clone against which paragraph the question is being matched in said compatibility test.

15. The storage medium of claim 10 in which said program is further configured to cause the computer system to take into account in the matching algorithm the frequency of occurrence of context phrases obtained from an AI clone and context phrases obtained from an advertisement.

16. The storage medium of claim 10 in which said program is further configured to cause the computer system to take into account, in said compatibility algorithm, sizes of the paragraphs from which the context phrases are obtained.

17. The storage medium of claim 10 in which said program is further configured to cause the computer system to calculate said weights as a metric related to frequency of occurrence of context phrases in the respective paragraphs from which the context phrases were obtained.

18. The storage medium of claim 10 in which said program is further configured to cause the computer system to calculate said weights as a metric related to frequency of occurrence of context phrases relative to the frequency of occurrence of other context phases in the paragraphs from which they were obtained.

* * * * *